US012771182B2

(12) United States Patent
Russell et al.

(10) Patent No.: US 12,771,182 B2
(45) Date of Patent: Oct. 20, 2026

(54) POWER ACCOUNTING FOR WIRELESS POWER TRANSFER

(71) Applicant: Apple Inc., Cupertino, CA (US)

(72) Inventors: Antoin J Russell, Mountain View, CA (US); Guangqi Zhu, Cupertino, CA (US); Jukka-pekka J Sjoeroos, Cupertino, CA (US); Stephen C Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/770,264

(22) Filed: Jul. 11, 2024

(65) Prior Publication Data

US 2025/0253717 A1 Aug. 7, 2025

Related U.S. Application Data

(60) Provisional application No. 63/549,736, filed on Feb. 5, 2024.

(51) Int. Cl.

| | |
|---|---|
| ***H02J 50/80*** | (2016.01) |
| ***H02J 50/00*** | (2016.01) |
| ***H02J 50/12*** | (2016.01) |
| ***H02J 50/60*** | (2016.01) |

(52) U.S. Cl.

CPC ............ *H02J 50/80* (2016.02); *H02J 50/005* (2020.01); *H02J 50/12* (2016.02); *H02J 50/60* (2016.02)

(58) Field of Classification Search

CPC .. H02J 50/80; H02J 50/12; H02J 50/60; H02J 50/005

USPC .......................................................... 307/104

See application file for complete search history.

(56) References Cited

U.S. PATENT DOCUMENTS

| | | | | |
|---|---|---|---|---|
| 8,766,484 B2 * | 7/2014 | Baarman | H04B 5/79 | 307/104 |
| 9,627,130 B2 * | 4/2017 | Golko | H01F 38/14 | |
| 11,362,548 B1 * | 6/2022 | Ren | H02J 50/80 | |
| 2011/0285214 A1 | 11/2011 | Stevens et al. | | |
| 2015/0102879 A1 * | 4/2015 | Jacobs | H01F 38/14 | 335/294 |

(Continued)

FOREIGN PATENT DOCUMENTS

| | | |
|---|---|---|
| EP | 4228123 A1 | 8/2023 |
| WO | 2020183819 A1 | 9/2020 |

OTHER PUBLICATIONS

Sun et al.; "Design of a Strong Robust Wireless Power Transfer System With Wide-Range Output Regulation Based on Due-Band Architecture"; IEEE Transactions on Industrial Electronics; vol. 70, No. 11, Dec. 6, 2022; pp. 11142-11152 (XP011940216).

*Primary Examiner* — Alfonso Perez Borroto

(74) *Attorney, Agent, or Firm* — FLETCHER YODER PC

(57) ABSTRACT

Operating a wireless power transfer system can include using wireless power transmitter control circuitry to: initiate a temporary pause of wireless power transfer; provide a stimulus signal to cause a resonant voltage in the wireless power transmitter coil during the temporary pause of wireless power transfer; use the resonant voltage to measure or characterize one or more parameters characterizing a wireless power transfer link, via the wireless power receiver coil, between the wireless power transmitter and the wireless power receiver; and thereafter resume wireless power transfer by ending the temporary pause of wireless power transfer.

19 Claims, 6 Drawing Sheets

(56) References Cited

U.S. PATENT DOCUMENTS

| | | | | |
|---|---|---|---|---|
| 2015/0270046 | A1* | 9/2015 | Golko | H01F 38/14 361/679.01 |
| 2015/0285926 | A1 | 10/2015 | Oettinger | |
| 2018/0191200 | A1 | 7/2018 | Dibben et al. | |
| 2021/0099027 | A1* | 4/2021 | Larsson | H02J 50/90 |
| 2021/0099030 | A1* | 4/2021 | Walton | H02J 50/90 |
| 2021/0099031 | A1* | 4/2021 | Jol | H02J 50/90 |
| 2021/0167637 | A1 | 6/2021 | Schwartz et al. | |
| 2021/0257866 | A1 | 8/2021 | Lee et al. | |
| 2021/0408830 | A1 | 12/2021 | Nagai et al. | |

* cited by examiner

POWER ACCOUNTING FOR WIRELESS POWER TRANSFER

CROSS-REFERENCE TO RELATED APPLICATIONS

This application claims priority to U.S. Provisional Application No. 63/549,736, filed Feb. 5, 2024, entitled "Power Accounting for Wireless Power Transfer," which is incorporated by reference herein in its entirety.

BACKGROUND

Wireless power transfer is used in electronic devices, such as smart phones, tablet computers, smart watches, wireless earphones, styluses, so forth, to facilitate charging of batteries within the devices. In some application, higher levels of wireless power transfer may be desired, for example to provide for faster charging. Such higher power transfer levels can benefit from techniques to tune system characteristics and operating parameters to improve operating efficiency, voltage regulation, foreign object detection, and the like.

SUMMARY

A wireless power transmitter can include a boot housing an inverter and wireless power transmitter control circuitry; a puck housing a wireless power transmitter coil; and a cable disposed between the boot and puck, the cable having two or more conductors including conductors that, in normal wireless power transfer operation, conduct an AC current between the inverter and the wireless power transmitter coil. The puck can further house a resonant capacitor and a plurality of switching devices operable to selectively provide a resonant current circulation path between the wireless power transmitter coil and the resonant capacitor during a remote ping operation. The wireless power transmitter control circuitry in the boot can further include logic and circuitry to selectively actuate the plurality of switching devices to provide the resonant current circulation path between the wireless power transmitter coil and the resonant capacitor in the remote ping operation via one of the two or more conductors; and analog measurement circuitry that measures a resonant voltage associated with the wireless power transmitting coil and the resonant capacitor via one of the two or more conductors.

The remote ping operation can be separate from normal wireless power transfer operation and can allow the wireless power transmitter control circuitry to measure or characterize one or more electrical, magnetic, or electromagnetic parameters characterizing a wireless power transfer link between the wireless power transmitter and an external object based on the resonant voltage associated with the wireless power transmitting coil and the resonant capacitor. The one or more electrical, magnetic, or electromagnetic parameters characterizing a wireless power transfer link can be used to detect a wireless power receiver. The one or more electrical, magnetic, or electromagnetic parameters characterizing a wireless power transfer link can be used to detect a foreign object. The resonant voltage associated with the wireless power transmitting coil and the resonant capacitor can be a ringing signal induced by a stimulus provided by the inverter on initiation of the remote ping operation. The logic and control circuitry can selectively actuate the plurality of switching devices via a third conductor of the two or more conductors, and the analog measurement circuitry can measure the resonant voltage associated with the wireless power transmitting coil and the resonant capacitor via one of the two or more conductors that, in normal wireless power transfer operation, conduct the AC current between the inverter and the wireless power transmitter coil.

A wireless power receiver can include a wireless power receiver coil; a rectifier having a rectifier input coupled to the wireless power receiver coil that receives an AC voltage induced by a wireless power transmitter coupled to the wireless power receiver via the wireless power receiver coil and produces, at a rectifier output, a DC rectifier output voltage for one or more receiver loads coupled to the rectifier output; and wireless power receiver control circuitry that detects a pause in wireless power transmission initiated by the wireless power transmitter to measure or characterize one or more parameters characterizing a wireless power transfer link, via the wireless power receiver coil, between the wireless power transmitter and the wireless power receiver; wherein the wireless power receiver control circuitry detects the pause in wireless power transmission by detecting changes in characteristics of one or more power transfer voltages, currents, frequencies in the wireless power receiver independently of communication with the wireless power transmitter.

The wireless power receiver control circuitry can detect the pause in wireless power transmission by detecting a reduction in the DC rectifier output voltage. The rectifier can be a synchronous rectifier, and the wireless power receiver control circuitry can detect the pause in wireless power transmission by detecting cessation of switching of the synchronous rectifier. The wireless power receiver control circuitry detects the pause in wireless power transmission by a change in waveform shape of a voltage appearing across the wireless power receiver coil from a square wave shape associated with inverter switching in the wireless power transmitter to a sinusoidal shape associated with a power pause. Responsive to detecting the pause in wireless power transmission, the wireless power receiver control circuitry can temporarily pause at least one of the one or more receiver loads coupled to the rectifier output. The wireless power receiver control circuitry can further detect an end of the pause in wireless power transmission by detecting changes in characteristics of one or more power transfer voltages, currents, frequencies in the wireless power receiver independently of communication with the wireless power transmitter. Responsive to detecting the end of the pause in wireless power transmission, the wireless power receiver control circuitry can resume the at least one of the one or more receiver loads coupled to the rectifier output that was paused responsive to detecting the pause in wireless power transmission. The at least one of the one or more receiver loads coupled to the rectifier output paused responsive to detecting the pause in wireless power transmission can include a switching converter. The wireless power receiver control circuitry can resume the at least one of the one or more receiver loads coupled to the rectifier output paused responsive to detecting the pause in wireless power transmission by ramping up the switching duty cycle of the switching converter to avoid an overshoot or overvoltage of the DC rectifier output voltage. Ramping up the switching duty cycle of the switching converter to avoid an overshoot or overvoltage of the DC rectifier output voltage can include storing a pre-power pause duty cycle value and using the pre-power pause duty cycle value as a feed forward signal to accelerate ramp up of the switching converter duty cycle.

A wireless power transfer system can have a wireless power transmitter including an inverter that drives a wireless power transmitter coil and a wireless power receiver including a wireless power receiver coil magnetically coupled to the wireless power transmitter coil, a rectifier having a rectifier input coupled to the wireless power receiver coil, and a rectifier output coupled to one or more wireless power receiver loads. A method of operating the wireless power transfer system can include using wireless power transmitter control circuitry to: initiate a temporary pause of wireless power transfer; provide a stimulus signal to cause a resonant voltage in the wireless power transmitter coil during the temporary pause of wireless power transfer; use the resonant voltage to measure or characterize one or more parameters characterizing a wireless power transfer link, via the wireless power receiver coil, between the wireless power transmitter and the wireless power receiver; and thereafter resume wireless power transfer by ending the temporary pause of wireless power transfer. The method can further include using wireless power receiver control circuitry to detect the temporary pause of wireless power transfer by detecting changes in characteristics of one or more power transfer voltages, currents, frequencies in the wireless power receiver independently of communication with the wireless power transmitter; responsive to detecting the temporary pause in wireless power transfer, temporarily pause at least one of the one or more receiver loads coupled to the rectifier output; detect resumption of wireless power transmission by detecting changes in characteristics of one or more power transfer voltages, currents, frequencies in the wireless power receiver independently of communication with the wireless power transmitter; and responsive to resumption of wireless power transmission, resume the at least one of the one or more receiver loads coupled to the rectifier output that was paused responsive to detecting the temporary pause in wireless power transmission.

The wireless power transmitter can include a boot housing the inverter and the wireless power transmitter control circuitry; a puck housing the wireless power transmitter coil, a resonant capacitor, and a plurality of switching devices operable to selectively provide a resonant current circulation path between the wireless power transmitter coil and the resonant capacitor during a remote ping operation; and a cable disposed between the boot and puck, the cable having at least three conductors including first and second conductors that, in normal wireless power transfer operation, conduct an AC current between the inverter and the wireless power transmitter coil and a third conductor that allows the wireless power transmitter control circuitry to selectively actuate the plurality of switching devices. Using the resonant voltage to measure or characterize one or more parameters characterizing a wireless power transfer link between the wireless power transmitter and the wireless power receiver can include selectively actuating the plurality of switching devices during the remote ping operation. Using the resonant voltage to measure or characterize one or more parameters characterizing a wireless power transfer link between the wireless power transmitter and the wireless power receiver can include detecting a foreign object. At least one of detecting the temporary pause of wireless power transfer by detecting changes in characteristics of one or more power transfer voltages, currents, frequencies in the wireless power receiver independently of communication with the wireless power transmitter and detecting resumption of wireless power transmission by detecting changes in characteristics of one or more power transfer voltages, currents, frequencies in the wireless power receiver independently of communication with the wireless power transmitter can include detecting a reduction in a rectifier output voltage. At least one of detecting the temporary pause of wireless power transfer by detecting changes in characteristics of one or more power transfer voltages, currents, frequencies in the wireless power receiver independently of communication with the wireless power transmitter and detecting resumption of wireless power transmission by detecting changes in characteristics of one or more power transfer voltages, currents, frequencies in the wireless power receiver independently of communication with the wireless power transmitter can include detecting cessation of switching of the rectifier.

DETAILED DESCRIPTION

Figure 1:
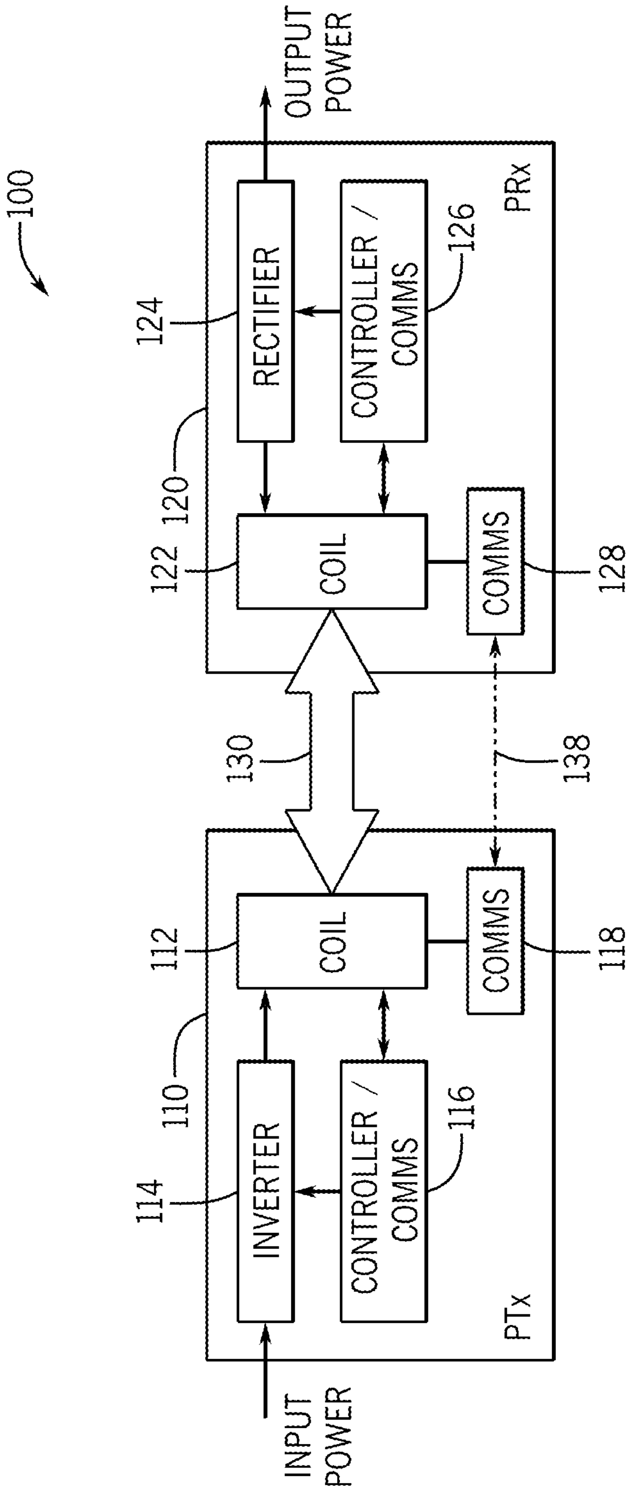
FIG. 1 illustrates a simplified block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather, the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry. PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
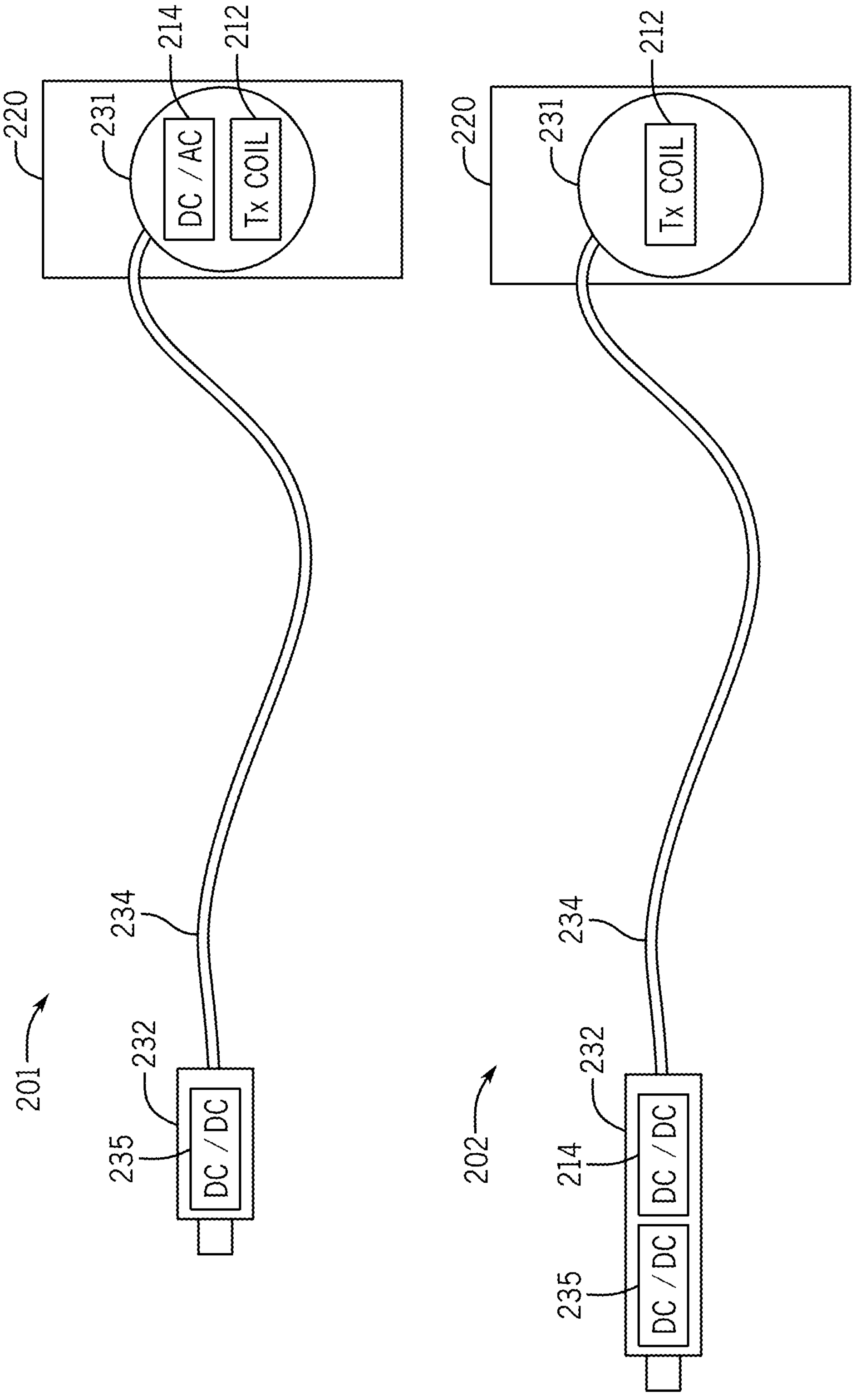
FIG. 2 illustrates alternative embodiments of a wireless charger device.

FIG. 2 illustrates alternative embodiments of a wireless charger device. More specifically wireless charger 201 is a wireless charger that can provide power to a wireless power receiver (PRx) device 220. The wireless charger 201 can have a puck 231 that can couple to the PRx 220, a cable 234, and a boot 232. In some embodiments, the puck 231 can be secured to the PRx 220 by magnets or other securing mechanisms. Boot 232 can include an electrical connection for coupling to a power source. For example, the electrical connection could be a USB (universal serial bus) connection that can couple to a corresponding USB port on a power adapter or on a device such as a desktop computer, laptop computer, tablet, etc. In some embodiments, the boot 232 can include a DC-DC converter 235 that converts a voltage received from the power source to a level suitable for use by the components in the puck 231. Components in the puck 231 can include an inverter (DC/AC converter) 214 and the wireless power transmitting coil 212. As described above, the wireless power transmitting coil 212 can couple to a corresponding wireless power receiving coil (not shown) in PRx 220.

The above-described arrangement results in a DC current flowing from the DC-DC converter 235, located in the boot 232 of wireless charger 201, to the inverter 214 located in the puck 231 of wireless charger 201. When constructed in this way, the power transfer capability to PRx 220 may be limited by thermal limitations associated with inverter 214 being located in puck 231. More specifically, there may be certain losses associated with operation of inverter 214, as well as certain losses associated with the wireless power receiving circuitry located in PRx 220 (as described above with reference to FIG. 1). In some cases, there may also be losses associated with charging of a battery (not shown) located in PRx 220. Each of these losses is located in relatively close physical proximity, and thus the combination of these losses can present thermal conditions that limit the amount of power that can be delivered to PRx 220 by wireless charger 201.

One way to address such losses can be to relocate inverter 214 from puck 231 to boot 232, as depicted with respect to wireless charger 202. As a result, the heat corresponding to losses associated with inverter operation can be moved from close proximity to the other losses described above, providing more headroom for increased levels of power transfer. This change in configuration results in an AC current (generated by inverter 214) being sent through cable 234. Additionally, puck 231 in such an embodiment includes power transmitting coil 212 as the only component of the wireless power transfer chain. It should be noted that other sensing and control components (i.e., non-power-carrying components) associated with the wireless power transfer system may still be located in puck 231, such as various components described above with respect to FIG. 1 and below with respect to FIG. 3.

Wireless power transfer systems may incorporate features that rely on a "ping" initiated by the wireless power transmitter to characterize the magnetic link between the wireless power transmitter and receiver, detect the presence of a wireless power receiver, detect the presence of a foreign object, etc. The general natures of these pings are that the wireless power transmitter provides some sort of stimulus signal to the resonant LC tank corresponding to the magnetic link. This will result in some sort of response, e.g., a ringing signal, that can be characterized in terms of its frequency, duration, decay envelope, etc. to identify electrical and/or magnetic characteristics of the magnetic link. For example, the Q-factor of the wireless power transmitter coil can be measured, which will be affected by various objects (such as a wireless power receiver and/or foreign object) that are magnetically and/or electrically coupled to the wireless power transmitter coil. In addition or as an alternative, parameters other than Q-factor can be measured, such as effective inductance, coupling coefficient, or other electrical, magnetic, and/or electromagnetic parameters or properties of the wireless link. These various parameters can be used for a variety of purposes, such as detecting the presence of a wireless power receiver, detecting the presence of a foreign object, detecting an object and determining whether the detected object is a wireless power receiver or a foreign object, estimating a degree of coupling or alignment between wireless power receiver and wireless power transmitter that can affect the level of power transfer, etc.

These pings initiated by the wireless power transmitter may be affected by the change in wireless charger configuration described above with reference to FIG. 2 in that the pings characterize the AC current path. By relocating the inverter from puck to boot, the cable 234 (now carrying an AC signal) becomes part of the AC circuit characterized by the ping signals. This can add an increased resistance associated with cable 234 that skews the measurements. Additionally, the impedance of the cable can change with use, aging, temperature, wear, etc. All of these factors can potentially make it harder to use such measurements for all desired purposes. Thus, it may be desirable in at least some embodiments to provide a mechanism to allow for "ping" measurements in a way that the additional impedance presented by the cable 234 can be eliminated.

Figure 3:
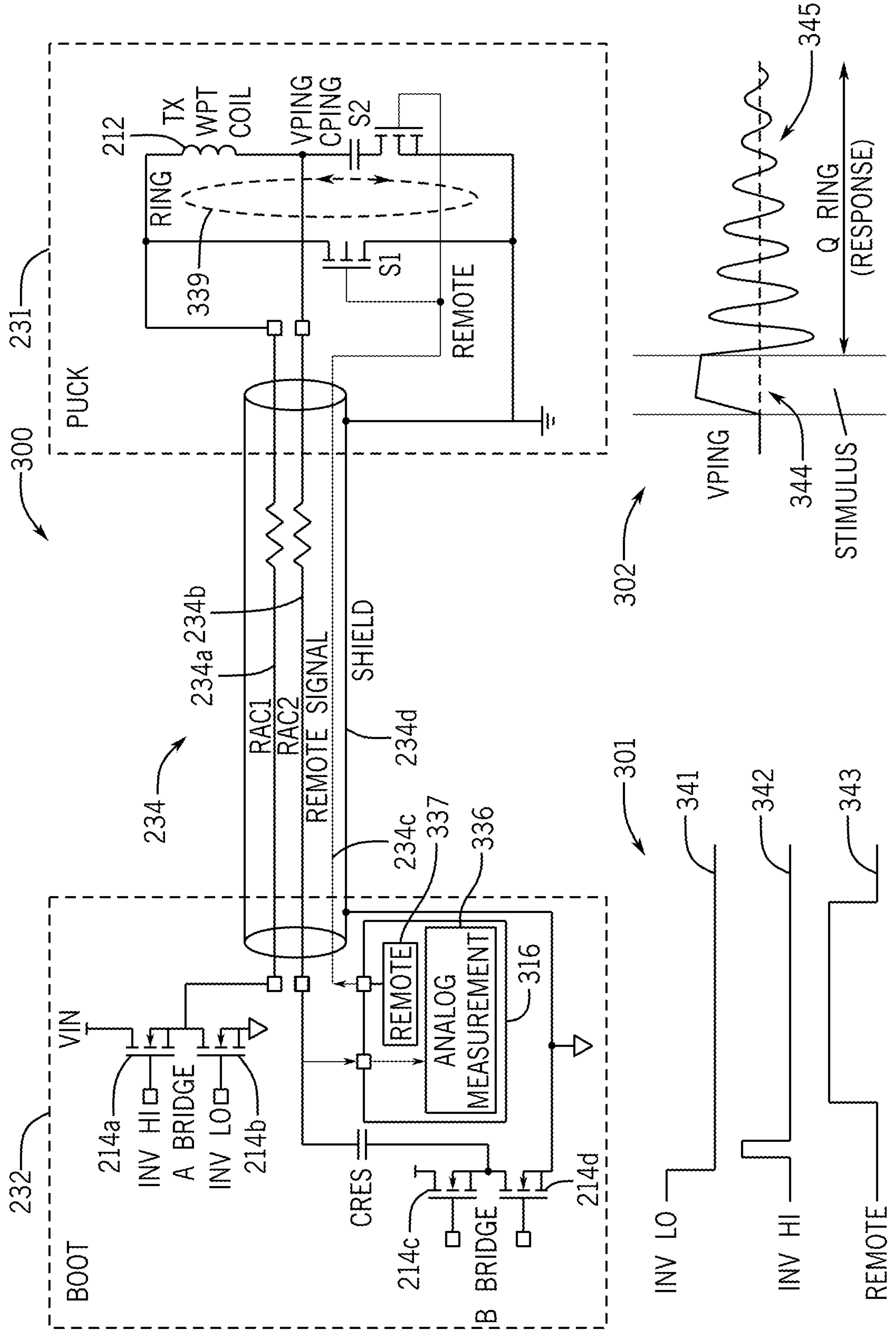
FIG. 3 illustrates a simplified schematic of a wireless charger device.

FIG. 3 illustrates a simplified schematic of a wireless charger 300 capable of a remote ping that can eliminate the effects of cable impedance overcoming the issues described above. More specifically, wireless charger 300 includes a boot 232, a puck 231, and a cable 234, as described above with respect to FIG. 3. Boot 232 can include a DC-DC converter (not shown). Boot 232 can also include an inverter, illustrated in the form of two switching bridges (A Bridge and B Bridge) each made up of a high side switching devices (214*a*/214*c*) and low side switching devices (214*b*/214*d*). Other inverter topologies could also be used. Boot 232 can also include a resonant capacitor Cres that can resonate with the wireless power transmitting coil 212 located in puck 231 during normal wireless power transfer operation. Additionally, boot 232 can include control circuitry 316, which, in addition to the components and functionality described above with respect to controller/communications module 116, can also implement analog measurement circuitry and logic 336 and remote ping control circuitry and logic 337, as described in greater detail below.

Cable 234 can include a cable for carrying power and signals between boot 232 and puck 231. Illustrated cable 234 includes two power conductors 234*a* and 234*b*, which couple the inverter to wireless power transmitter coil 212 located in the puck. Each of these conductors may have an associated impedance, depicted in FIG. 3 as AC resistances Rac1 and Rac2. In at least some embodiments, the AC resistance of these conductors may be considered as the predominant component of the cable's impedance; however, there may also be parasitic inductances and capacitances associated with the cable and its length. However, the effects of the impedance, of any nature, can be mitigated by the techniques described below. Cable 234 can also include a remote signal conductor 234*c* used as part of a remote ping process described in greater detail below. Cable 234 may also include other conductors used with sensing components (e.g., temperature sensors) or other components (not shown) that can be located in puck 231. Finally, cable 234 may also include a shield 234*d*, which may be coupled to the ground references for both boot 232 and puck 231.

Puck 231 can include wireless power transmitting coil 212 as described above. Wireless power transmitting coil 212 can be coupled to the inverter in boot 232 by cable 234, specifically conductors 234*a*/234*b*. Puck 231 can also include a capacitor Cping and switching devices S1 S2 used for remote ping operation. More specifically, during normal operation, switches S1 and S2 can be open, disconnecting capacitor Cping from the circuit and allowing normal operation. Switches S1 and S2 can be controlled by remote switch controller 337, which can be circuitry and or logic incorporated in control circuitry 316, as described above. Thus, during a remote ping operation, which can occur prior to wireless power transfer inverter operation or during a pause in wireless power transfer inverter operation may be paused (as described in greater detail below), remote switch controller 337 can close switches S1 and S2, effectively providing a current path 339 for a ringing signal in the resonant circuit formed by wireless power transmitter coil 212 and resonant capacitor Cping.

During this remote ping period, the ringing voltage at the terminal forming the junction between wireless power transmit coil 212 and resonant capacitor Cping can be measured via analog measurement circuitry and logic 336 (discussed above), to which this node is coupled by conductor 234*b*. Analog measurement circuitry and logic 336 may include an analog to digital converter (A/D converter) to convert the measured voltage into a digital value that can be used by one or more processors or other digital control circuits of control circuitry 316. Analog measurement circuitry 336 could also or alternatively include other signal conditioning circuitry (buffer amplifiers, error amplifiers, etc.) allowing the signal to be used by control circuitry 336. In any case, analog measurement circuitry 336 can present a very high impedance, such that little to no current flows in conductor 234*b*, such that the impedance associated with cable 234 does not affect measurements associated with the remote ping operation.

Also depicted in FIG. 3 are signal plots 301 and 302 illustrating further aspects of the remote ping operation. Plot 301 depicts the output 341 of inverter low side switch 214*b*, illustrating a switch off transition associated with cessation of inverter operation. Plot 301 further depicts the output 342 of inverter high side switch 214*a*, which can be a pulse providing the inverter input voltage Vin to the wireless power transmitter coil 212. This can be the "ping" or stimulus signal described above. Finally, plot 301 further depicts the output 343 of remote switch controller 337, which, after the stimulus signal, closes, providing the ringing current circulation path described above. Plot 302 illustrates the ringing signal Vping appearing at the junction between wireless power transmitter coil 212 and resonant capacitor Cping and measured by analog measurement circuitry and logic 336 via conductor 234*b*, as described above. The signal includes an initial portion 344, corresponding to the stimulus pulse, and a response portion 345, corresponding to the ringing period. This ringing signal, as measured by analog measurement circuitry and logic 316 can be processed to determine the Q factor of wireless power transmitter coil 212 or other electrical, magnetic, or electromagnetic properties that can be used to characterize the wireless link between wireless power transmitter and receiver, detect the presence of a wireless power receiver, detect the presence of a foreign object, etc.

Figure 4:
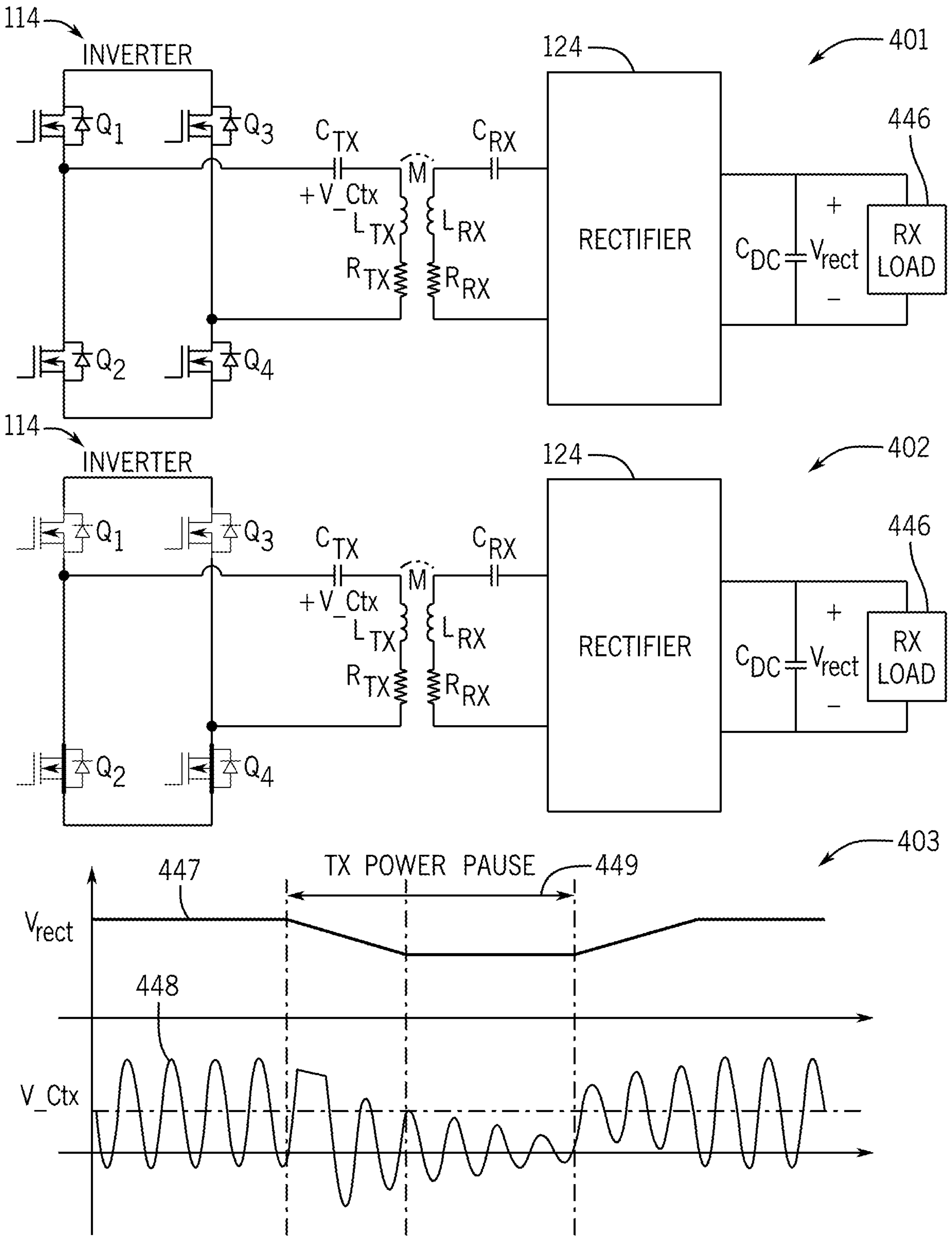
FIG. 4 illustrates a technique for pausing wireless power transfer to perform measurements characterizing the wireless link in a wireless power transfer system.

FIG. 4 illustrates a technique for pausing wireless power transfer to perform measurements characterizing the wireless link in a wireless power transfer system. FIG. 4 includes a first simplified schematic 401 depicting a wireless power transfer system in a normal power transfer operation. FIG. 4 also includes a second simplified schematic 402 depicting a wireless power transfer system in a power pause mode allowing for ringing of the resonant circuit to be measured. This measurement may, but need not, use a remote ping arrangement, as described above. FIG. 4 also depicts a plot 403 illustrating rectifier output voltage Vrect/447 and resonant capacitor voltage V_Ctx/448 during a power pause period 449.

Turning to the first schematic, a wireless power transfer system 401 in normal operation can include a wireless power transmitter and wireless power receiver as described above. The wireless power transmitter can include an inverter 114 including switching devices Q1-Q4. The illustrated topology is merely exemplary, and other inverter topologies could also be used. The wireless power transmitter can also include a wireless power transmitter coil, represented by the series combination of inductor $L_{TX}$ and $R_{TX}$, corresponding to the inductance and resistance of the wireless power transmitter coil, respectively. The wireless power transmitter coil can be coupled to the inverter 114 by a resonant capacitor $C_{TX}$.

The wireless power receiver can include a rectifier 124, illustrated in block diagram form, which can include any of a variety of rectifier bridge configurations, such as half bridge, full bridge, etc. Additionally, the rectifier may include "passive" rectifier devices, e.g., diodes, or active rectifier devices, including switching devices such as MOSFETs, JFETs, IGBTs, BJTs, etc. The switching devices may be implemented using any suitable semiconductor technology, such as silicon (Si), silicon carbide (SiC), gallium nitride (GaN), etc. In at least one embodiment, rectifier 124 can be a full bridge active (synchronous) rectifier formed of MOSFET switches. The input of rectifier 124 can be coupled to the wireless power receiving coil, represented in FIG. 4 by the series combination of inductor $L_{RX}$ and resistor $R_{RX}$, respectively corresponding to the inductance and resistance of the wireless power receiver coil. Rectifier 124 and the wireless power receiver coil can be coupled by a resonant capacitor $C_{RX}$. Magnetic coupling between the wireless power transmitter and wireless power receiver is represented by the mutual inductance M between inductors $L_{TX}$ and $L_{RX}$. The output of rectifier 124 is a DC voltage Vrect that is provided to a receiver load 446. In some cases, receiver load 446 may be a further regulator/converter that provides one or more regulated voltage to a variety of receiver system loads. A rectifier output capacitor $C_{DC}$ may be provided for output bus filtering, load holdup, etc.

With reference to the second schematic 402, the wireless power transfer system (including the same components as described a above with reference to schematic 401) can operate in a "power pause" mode to measure properties of the magnetic link between wireless power transmitter and receiver corresponding to the "ping" operation described above. This power pause includes stopping switching of the inverter switching devices Q1-Q4 to stop power delivery from the wireless power transmitter to the wireless power receiver. The power pause can additionally include opening upper switching devices Q1/Q2 and closing lower switching devices Q2/Q4, effectively short circuiting the resonant tank made up of capacitor $C_{TX}$ and the wireless power receiver coil. In some embodiments, this short circuiting can be performed using remote ping arrangements as described above with respect to FIGS. 2 and 3. In either case, the stimulation provided to the resonant tank is the previous power transfer and its cessation for the power pause. This can be understood with reference to plot 403 of FIG. 4.

Plot 403 plots the rectifier output voltage $V_{rect}$ as curve 447 and the V_Ctx, the voltage across the wireless power transmitter resonant capacitor $C_{TX}$, as curve 448. The power pause interval 449 begins when the inverter stops switching. Prior to this moment, Vrect can be at its nominal value, and the voltage V_Ctx can be a sinusoidal voltage with a DC offset. Once the inverter stops switching, V_Ctx begins a decayed ringing. Also, the DC offset of this signal is eliminated. During this same interval, $V_{rect}$ also begins to decay. The wireless power receiver side circuitry can detect the power pause using various techniques described in greater detail below. When the wireless power receiver detects the power pause, it can control the receiver loads 446 to stop drawing power from the rectifier output/rectifier output capacitor $C_{DC}$. For example, a battery charger or other switching converter/regulator can be disabled. As a result, the decay of rectifier output voltage $V_{rect}$ can be stopped, and $V_{rect}$ can hold at a value below its nominal value. After the wireless power transmitter has completed its measurements characterizing the magnetic link between wireless power transmitter and receiver, it can resume normal operation, restoring normal switching of the inverter. This results in restoration of the DC offset in curve 448, as well as reversal of the decaying/ringing signal, by returning V_Ctx to its normal DC offset sinusoidal form. Additionally, rectifier output voltage $V_{rect}$ will begin increasing, eventually returning to its nominal value. Contemporaneously therewith, the wireless power receiver can detect the end of the power pause using various techniques described in greater detail below and allow receiver load 446 to resume normal operation. Further details of these power pause operations are described in greater detail below with reference to FIGS. 5 and 6.

Figure 5:
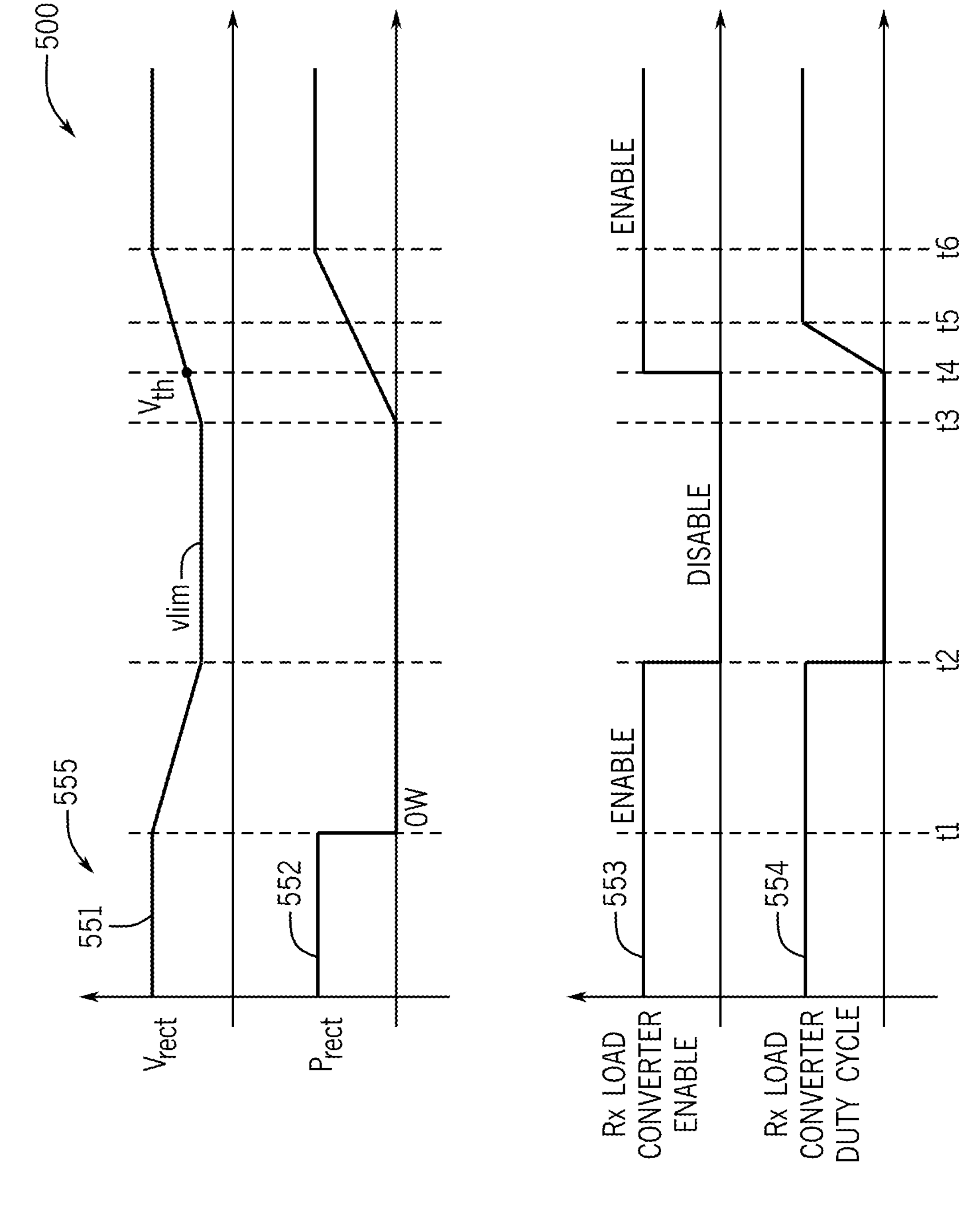
FIG. 5 illustrates wireless power receiver operation during a pause in wireless power transfer to perform measurements characterizing the wireless link in a wireless power transfer system.

FIG. 5 illustrates wireless power receiver operation during a pause in wireless power transfer allowing the wireless power transmitter to perform measurements characterizing the wireless link in a wireless power transfer system. The illustration of FIG. 5 includes a plot 500 of various receiver-side waveforms. The first plotted waveform 551 is the rectifier output voltage $V_{rect}$, as described above with reference to FIG. 4. The second plotted waveform 552 illustrates power drawn from the rectifier (Prect), for example by receiver load 446 as described above. The third plotted waveform 553 is an exemplary enable/disable signal for the receiver load 446, which for purposes of this example is a switching regulator/converter that converts the rectifier output to one or more regulated voltages or currents for various other loads. In some embodiments, this might be a battery charger, but could also be another converter/regulator. The fourth plotted waveform 554 is an exemplary switching duty cycle of the receiver load 446.

Prior to time t1, which marks the beginning of the power pause interval, the wireless power transfer system can be operating in a normal power transfer mode 555. As such, rectifier output voltage Vrect can be at its nominal value. This nominal value can be determined based on system requirements, available input voltage, power transfer level, and other factors. In some embodiments, it may be a voltage of 28V, but other voltages such as 5V, 9V, 10V, 12V, 15V, 18V, 19V, 20V, 24V, 25V, 30V, etc. may be used as appropriate. Also, during this interval before time t1, the power drawn from the rectifier can be at a nominal value required by the wireless power receiver and its associated systems. In some embodiments, this could correspond to a power level of 5 W, 7.5 W, 10 W, 12 W, 15 W, 20 W, 25 W, 30 W, 35 W, 40 W, 50 W, etc. Likewise, the receiver load converter may be enabled during this time period, and the receiver load converter may be operating with a duty cycle corresponding to its input voltage (i.e., the rectifier output voltage Vrect), its output voltage(s) and/or current(s), the power required by the various loads downstream of the converter, etc.

At time t1, the power pause interval may be initiated by the wireless power transmitter ceasing normal inverter switching and shorting the wireless power transmitter coil to measure properties of the electromagnetic link between wireless power transmitter and receiver. As a result, the power drawn from the rectifier ceases, as indicated by curve 552. During the power pause interval, no power is delivered from the wireless power transmitter to the wireless power receiver. However, the receiver load converter remains enabled, as indicated by curve 553, and the receiver load converter duty cycle continues at its nominal value determined by downstream load requirements as described above. This results in a decay of the rectifier output voltage Vrect as the output capacitor VDC is supplying the energy required by the receiver load 446.

At time t2, the rectifier output voltage will have decayed to a lower limit value vlim as a result of the receiver loads continuing to draw power from the rectifier output capacitor VDC. At time t2, the receiver can detect the power pause and disable the receiver load converter (as indicated by curve 553), which will result in the receiver load converter having a zero duty cycle (as indicated by curve 554). The receiver controller (for example, the receiver side controller/communications module 126 described above) can perform both this detection of the power pause and the corresponding shutdown of the receiver load, such as receiver load converter 446.

The receiver controller can detect the power pause in various ways. For example, the receiver controller can detect the decay of the rectifier output voltage Vrect to the reduced level vlim. This value might be a fixed voltage value less than the nominal rectifier output voltage or may be a percentage of the nominal rectifier output voltage. As one example, for a 28V nominal $V_{rect}$ voltage, the vlim limit voltage might be 23.5V, although other values are also possible. Such values might be 90%, 85%, 80%, 75%, 70%, etc. of the nominal voltage, or any other suitable value in a particular embodiment, such as percentages between any of the foregoing, e.g., between 85-90%, 80-85%, 75-80%, 70-75%, etc.

The receiver controller could also detect the cessation of switching of active/synchronous rectifier 124 or other signals resulting from the power pause. Such signals might include, but are not limited to as a change in the nature of the waveform appearing across the wireless power receiver coil ($L_{RX}$/$R_{RX}$) and/or receiver capacitor $C_{RX}$, such as a decreased voltage or current level, change in frequency, or change in waveform shape (e.g., from a square wave associated with normal switching to a sine wave associated with the power pause/ring-down on the transmitter side). In some embodiments, the receiver controller could also receive a communication from the wireless power transmitter indicating the power pause; however, in some cases, in-band communication between wireless power transmitter and receiver may be sufficiently slow that it would be necessary for the transmitter to notify (or begin notifying) the wireless power receiver in advance of the power pause to allow time to send the packets/bits required to convey such a message. Thus, it may be preferable for the wireless power receiver controller to be able to detect the power pause based on characteristics of one or more power transfer voltages, currents, or frequencies, without relying on a normal in-band communication mechanism.

At time t3, when the wireless power transmitter has completed its measurements, it can resume normal inverter operation and wireless power transfer. In some embodiments, the time required for the power pause may be on the order of 10s to low 100s of microseconds, although other intervals are possible. Such a short duration suggests the desirability of the receiver detecting the power pause directly, rather than relying on a communication from the wireless power transmitter, which might take somewhat longer than the pause depending on the in-band communications implementation. In any case, the resumption of inverter switching and wireless power transfer can cause the rectifier output voltage ($V_{rect}$) and power drawn from the rectifier (Prect) to begin ramping up as illustrated by curves 551 and 552 in the interval between t3 and t4 in FIG. 5. In this interval, the power drawn from the rectifier is recharging the rectifier output capacitor $C_{DC}$. At time t4, the wireless power receiver (i.e., receiver control circuitry) can detect that wireless power transfer has resumed. One possible trigger for such detection could be the increase of rectifier output voltage Vrect to a threshold value Vth that is greater than the lower limit value vlim but lower than the nominal value of Vrect (e.g., the value prior to the power pause). In some embodiments, such as the 28V embodiment referenced above, the threshold voltage Vth could be 26V, although other suitable values may be used, including values in the percentage ranges described above.

In any case, detection of this increase, can trigger the wireless power receiver controller to re-enable the receiver load converter, as indicated by curve 553. This decision could also (alternatively or additionally) be triggered by a time-delay after the rectifier output voltage Vrect or output power Prect begin increasing, by a detection of other voltage, current, frequency, or waveshape characteristic indicating resumption of wireless power transfer. As a result, during the interval from time t4 (when the receiver controller detects resumption of wireless power transfer) until t5, the receiver controller can ramp up the switching duty cycle of the receiver load converter sufficiently quickly to avoid an overshoot/overvoltage of the rectifier output voltage. This can be accomplished in various ways, such as by the receiver controller storing the pre-power pause duty cycle value and using it as a feed forward signal to accelerate ramp up of the load converter duty cycle. In either case, it may be desirable for the load converter to have resumed its nominal power transfer level before complete recovery of the rectifier output voltage (Vrect) and rectifier output power (Prect), which corresponds to the interval between times t5 and t6 in FIG. 5.

Figure 6:
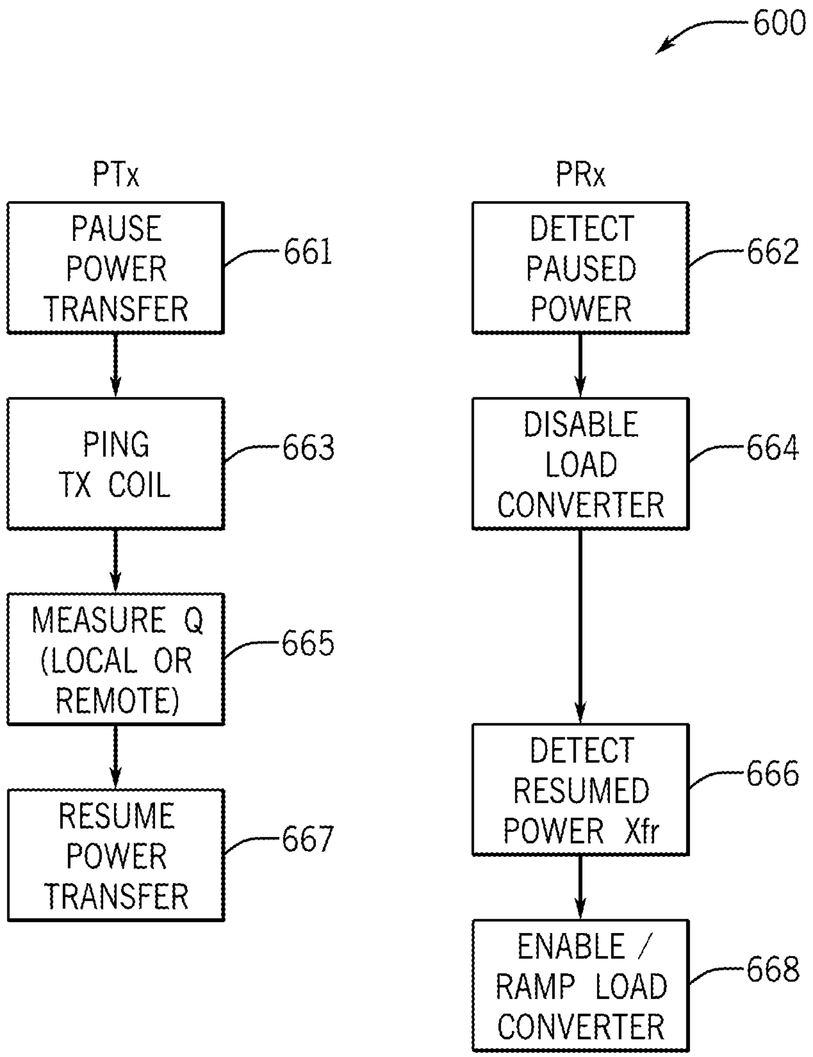
FIG. 6 illustrates a simplified flow chart of wireless power transmitter and wireless power receiver operation during a pause in wireless power transfer to perform measurements characterizing the wireless link in a wireless power transfer system.

FIG. 6 illustrates a simplified flow chart 600 of wireless power transmitter (PTx) and wireless power receiver (PRx) operation during a pause in wireless power transfer to perform measurements characterizing the wireless link in a wireless power transfer system. Beginning with block 661, the wireless power transmitter can pause power transfer. The wireless power transmitter can then "ping" the wireless power transmitter coil (block 663). This "ping" can include providing a stimulus signal to the coil, e.g., using the inverter. In some cases, the stimulus signal can be the cessation of wireless power transfer itself. Thereafter (block 665), the wireless power transmitter can measure Q-factor or other electrical, magnetic, or electromagnetic property that characterizes the link between the wireless power transmitter and wireless power receiver. These measurements can be made using the remote ping techniques described above or by shorting the wireless power transmitting coil using the inverter switches.

In either case, the resulting measurements and characterizations can subsequently be used to detect the presence of a wireless power receiver and/or a foreign object and set an appropriate wireless power transfer level based at least in part thereon. Additionally or alternatively, these measurements and characterizations can be used to determine a degree of coupling between wireless power transmitter and wireless power receiver and set an appropriate power transfer level based at least in part thereon. After completing the measurements/characterizations, the wireless power transmitter can resume wireless power transfer (block 667). These PTx side operations can be performed by control circuitry associated with the wireless power transmitter, such as controller/communications module 116, discussed above.

On the receiver (PRx) side, once the transmitter (PTx) has paused power transfer, the receiver can detect the pause in power transfer (block 662). This can be substantially contemporaneous with the ping initiated by the transmitter and/or the measurements made on the wireless power transmitter side. In any case, after detecting the power pause, the wireless power receiver controller can disable the load converter (block 664). As described above, this can be responsive to various signals measured by the receiver controller on the receiver side without receiving a communication from the wireless power transmitter. Once the wireless power transmitter has resumed wireless power transfer (block 667), the receiver controller can detect resumed power transfer (block 666) and, responsive thereto, can re-enable and ramp up the load converter (block 668), as described above. These PRx side operations can be performed by control circuitry associated with the wireless power transmitter, such as controller/communications module 126, discussed above.

The operations described above refer to various voltage levels and thresholds, power levels and thresholds, etc. The descriptions herein may be applied to various systems operating at different voltage levels, different power levels, etc. For example, in some embodiments, the input voltage may be controllable to be in a range between about 16V and 20V, whether by manipulation of the control signal for a DC-DC converter or otherwise. Such a voltage range may, but need not, correspond to a USB-PD power source providing a 20V input voltage to such DC-DC converter. However, operation in other voltage ranges corresponding to other USB-PD voltage levels may also be appropriate. For example, an input voltage range between about 10V and 15V or 12V and 15V may be used with a 15V USB-PD supply. Alternatively, if a buck-boost converter were used to provide Vin from the power source, the top of the supplied voltage range could go above the voltage supplied to such DC-DC converter. Similarly, with respect to power thresholds, a 15 W power threshold may serve as the demarcation between a low power regime and a higher power regime. Operating above this threshold could be used to selectively enable or disable functionality such as the input voltage reduction before initiating a change in capacitance on either the PTx or PRx side. However, 15 W is just one example of such a threshold, and this threshold could be 10 W, 12 W, 16 W, 18 W, 20 W, 22 W, 25 W, 28 W, 30 W, 32 W, 35 W, 38 W, 40 W, 45 W, 50 W, or any other suitable value. If a degree of hysteresis is desired, an additional power threshold could be used to indicate the return to a low power regime. Such a threshold might be 9 W, although any value less than the high power threshold could be used, such as a value of 12 W, 10 W, 7.5 W, 5 W, etc. Unless otherwise specified herein or in the appended claims any of the above-described values could be employed; however, for at least some applications, there may be advantageous reasons to employ certain specific thresholds.

Described above are various features and embodiments relating to system and operating parameter measurement in wireless power transfer systems. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information between the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

The invention claimed is:

1. The wireless-power wherein: A wireless power transmitter comprising:

a boot housing an inverter and wireless power transmitter control circuitry;

a puck housing a wireless power transmitter coil; and a cable disposed between the boot and puck, the cable having two or more conductors including conductors that, in normal wireless power transfer operation, conduct an AC current between the inverter and the wireless power transmitter coil;

wherein:

the puck further houses a resonant capacitor and a plurality of switching devices operable to selectively provide a resonant current circulation path between the wireless power transmitter coil and the resonant capacitor during a remote ping operation; and the wireless power transmitter control circuitry in the boot includes:

logic and circuitry to selectively actuate the plurality of switching devices to provide the resonant current circulation path between the wireless power transmitter coil and the resonant capacitor in the remote ping operation via one of the two or more conductors; and analog measurement circuitry that measures a resonant voltage associated with the wireless power transmitting coil and the resonant capacitor via one of the two or more conductors.

2. The wireless power transmitter of claim 1 wherein the remote ping operation is separate from normal wireless power transfer operation and allows the wireless power transmitter control circuitry to measure or characterize one or more electrical, magnetic, or electromagnetic parameters characterizing a wireless power transfer link between the wireless power transmitter and an external object based on the resonant voltage associated with the wireless power transmitting coil and the resonant capacitor.

3. The wireless power transmitter of claim 2 wherein the one or more electrical, magnetic, or electromagnetic parameters characterizing a wireless power transfer link are used to detect a wireless power receiver.

4. The wireless power transmitter of claim 2 wherein the one or more electrical, magnetic, or electromagnetic parameters characterizing a wireless power transfer link are used to detect a foreign object.

5. The wireless power transmitter of claim 2 wherein the resonant voltage associated with the wireless power transmitting coil and the resonant capacitor is a ringing signal induced by a stimulus provided by the inverter on initiation of the remote ping operation.

6. The wireless power transmitter of claim 1 wherein the logic and control circuitry selectively actuates the plurality of switching devices via a third conductor of the two or more conductors, and the analog measurement circuitry measures the resonant voltage associated with the wireless power transmitting coil and the resonant capacitor via one of the two or more conductors that, in normal wireless power transfer operation, conduct the AC current between the inverter and the wireless power transmitter coil.

7. A wireless power receiver comprising:

a wireless power receiver coil;

a rectifier having a rectifier input coupled to the wireless power receiver coil that receives an AC voltage induced by a wireless power transmitter coupled to the wireless power receiver via the wireless power receiver coil and produces, at a rectifier output, a DC rectifier output voltage for one or more receiver loads coupled to the rectifier output; and wireless power receiver control circuitry that detects a pause in wireless power transmission initiated by the wireless power transmitter to measure or characterize one or more parameters characterizing a wireless power transfer link using a stimulus signal received via the wireless power receiver coil, between the wireless power transmitter and the wireless power receiver;

wherein the wireless power receiver control circuitry detects the pause in wireless power transmission by detecting changes in characteristics of one or more power transfer voltages, currents, frequencies in the wireless power receiver independently of communication with the wireless power transmitter.

8. The wireless power receiver of claim 7 wherein the wireless power receiver control circuitry detects the pause in wireless power transmission by detecting a reduction in the DC rectifier output voltage.

9. The wireless power receiver of claim 7 wherein the rectifier is a synchronous rectifier, and the wireless power receiver control circuitry detects the pause in wireless power transmission by detecting cessation of switching of the synchronous rectifier.

10. The wireless power receiver of claim 7 wherein the wireless power receiver control circuitry detects the pause in wireless power transmission by a change in waveform shape of a voltage appearing across the wireless power receiver coil from a square wave shape associated with inverter switching in the wireless power transmitter to a sinusoidal shape associated with a power pause.

11. The wireless power receiver of claim 7 wherein, responsive to detecting the pause in wireless power transmission, the wireless power receiver control circuitry temporarily pauses at least one of the one or more receiver loads coupled to the rectifier output.

12. The wireless power receiver of claim 7 wherein:

the wireless power receiver control circuitry further detects an end of the pause in wireless power transmission by detecting changes in characteristics of one or more power transfer voltages, currents, frequencies in the wireless power receiver independently of communication with the wireless power transmitter; and responsive to detecting the end of the pause in wireless power transmission, the wireless power receiver control circuitry resumes the at least one of the one or more receiver loads coupled to the rectifier output that was paused responsive to detecting the pause in wireless power transmission.

13. The wireless power receiver of claim 12 wherein:

the at least one of the one or more receiver loads coupled to the rectifier output paused responsive to detecting the pause in wireless power transmission includes a switching converter; and the wireless power receiver control circuitry re-enables the at least one of the one or more receiver loads coupled to the rectifier output paused responsive to detecting the pause in wireless power transmission by ramping up the switching duty cycle of the switching converter to avoid an overshoot or overvoltage of the DC rectifier output voltage.

14. The wireless power receiver of claim 12 wherein ramping up the switching duty cycle of the switching converter to avoid an overshoot or overvoltage of the DC rectifier output voltage comprises storing a pre-power pause duty cycle value and using the pre-power pause duty cycle value as a feed forward signal to accelerate ramp up of the switching converter duty cycle.

15. A method of operating a wireless power transfer system having a wireless power transmitter including an inverter that drives a wireless power transmitter coil and a wireless power receiver including a wireless power receiver coil magnetically coupled to the wireless power transmitter coil, a rectifier having a rectifier input coupled to the wireless power receiver coil and a rectifier output coupled to one or more wireless power receiver loads, the method comprising:

using wireless power transmitter control circuitry to:

initiate a temporary pause of wireless power transfer;

provide a stimulus signal to cause a resonant voltage in the wireless power transmitter coil during the temporary pause of wireless power transfer;

use the resonant voltage to measure or characterize one or more parameters characterizing a wireless power transfer link, via the wireless power receiver coil, between the wireless power transmitter and the wireless power receiver; and thereafter resume wireless power transfer by ending the temporary pause of wireless power transfer; and using wireless power receiver control circuitry to:

detect the temporary pause of wireless power transfer by detecting changes in characteristics of one or more power transfer voltages, currents, frequencies in the wireless power receiver independently of communication with the wireless power transmitter;

responsive to detecting the temporary pause in wireless power transfer, temporarily pause at least one of the one or more receiver loads coupled to the rectifier output;

detect resumption of wireless power transmission by detecting changes in characteristics of one or more power transfer voltages, currents, frequencies in the wireless power receiver independently of communication with the wireless power transmitter; and responsive to resumption of wireless power transmission, resume the at least one of the one or more receiver loads coupled to the rectifier output that was paused responsive to detecting the temporary pause in wireless power transmission.

16. The method of claim 15 wherein:

the wireless power transmitter includes a boot housing the inverter and the wireless power transmitter control circuitry; a puck housing the wireless power transmitter coil, a resonant capacitor, and a plurality of switching devices operable to selectively provide a resonant current circulation path between the wireless power transmitter coil and the resonant capacitor during a remote ping operation; and a cable disposed between the boot and puck, the cable having at least three conductors including first and second conductors that, in normal wireless power transfer operation, conduct an AC current between the inverter and the wireless power transmitter coil and a third conductor that allows the wireless power transmitter control circuitry to selectively actuate the plurality of switching devices; and using the resonant voltage to measure or characterize one or more parameters characterizing a wireless power transfer link between the wireless power transmitter and the wireless power receiver comprises selectively actuating the plurality of switching devices during the remote ping operation.

17. The method of claim 15 wherein using the resonant voltage to measure or characterize one or more parameters characterizing a wireless power transfer link between the wireless power transmitter and the wireless power receiver comprises detecting a foreign object.

18. The method of claim 15 wherein at least one of detecting the temporary pause of wireless power transfer by detecting changes in characteristics of one or more power transfer voltages, currents, frequencies in the wireless power receiver independently of communication with the wireless power transmitter and detecting resumption of wireless power transmission by detecting changes in characteristics of one or more power transfer voltages, currents, frequencies in the wireless power receiver independently of communication with the wireless power transmitter comprises detecting a reduction in a rectifier output voltage.

19. The method of claim 15 wherein at least one of detecting the temporary pause of wireless power transfer by detecting changes in characteristics of one or more power transfer voltages, currents, frequencies in the wireless power receiver independently of communication with the wireless power transmitter and detecting resumption of wireless power transmission by detecting changes in characteristics of one or more power transfer voltages, currents, frequencies in the wireless power receiver independently of communication with the wireless power transmitter comprises detecting cessation of switching of the rectifier.

* * * * *